3,311,619
METHINE DYES FOR ACRYLIC FIBERS
John G. Fisher and James M. Straley, Kingsport, Tenn., assignors to Eastman Kodak Company, Rochester, N.Y., a corporation of New Jersey
No Drawing. Filed May 5, 1964, Ser. No. 365,204
12 Claims. (Cl. 260—240.8)

This invention relates to methine compounds particularly useful in the art of dyeing textile materials.

The methine compounds of the invention have the general formula I

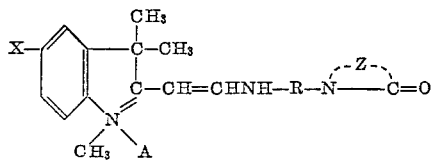

wherein
X=hydrogen, halogen such as chlorine and bromine or a carboalkoxy radical such as lower carboalkoxy, e.g. $COOCH_3$ and $COOC_2H_5$,
A=an acid anion such as a monovalent organic or inorganic acid anion of acids such as hydrochloric acid, hydrobromic acid, sulfuric acid and p-toluene sulfonic acids,
R=a monocyclic aromatic radical of the benzene series including a p-phenylene radical such as p-phenylene and substituted p-phenylene including alkyl-p-phenylene such as o-lower alkyl-p-phenylene, e.g.

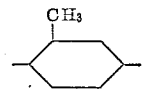

and m-lower alkyl-p-phenylene, e.g.

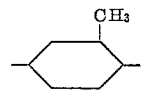

Z=the atoms necessary to complete succinimido, pyrrolidone, substituted succinimido and pyrrolidone radicals such as lower alkyl pyrrolidone, e.g. 2-methyl pyrrolidone.

A particularly efficacious group of the methine compounds have the general formula II

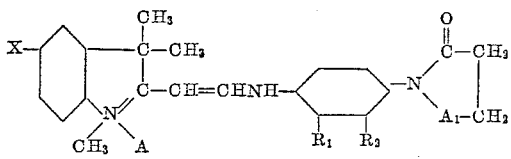

wherein
X and A are substituents described above,
$R_1$ and $R_2$ each=either hydrogen or lower alkyl,
$A_1$=—CO—, —$CH_2$— or —$CH(CH_3)$—.

Herein lower alkyl means a straight or branch-chained alkyl group containing 1 to 4 carbon atoms.

The methine compounds of the invention are useful, for example, as dyes for textile materials. The compounds are particularly useful for dyeing Orlon acrylic, Verel modacrylic and similar textile materials, in the form of fibers, yarns and fabrics giving fast brilliant yellow shades on these materials. The methine compounds are water-soluble and should be free of groups such as carboxyl and sulfo groups. In general, the dyes have good fastness, for example, to light, washing, gas (atmospheric fumes) and sublimation. The methine compounds are very useful for dyeing mixed fiber textile materials such as those containing acrylic and cellulose ester fibers whereby they dye only the acrylic fibers and do not stain the cellulose ester fiber, contrary to similar methine compounds of the prior art.

The methine compounds are prepared, as shown by the examples below, by condensing in dilute acid solution 1,3,3-trimethylindoline-2-methylene-ω-aldehydes with amines having the formula

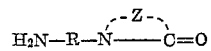

and particularly the formula

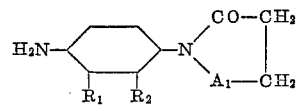

in which R, $R_1$, $R_2$, $A_1$ and Z are as described above.

Representative intermediates useful in preparing the methine compounds are:

| | M.P., °C. |
|---|---|
| N-(4-nitro-3-methylphenyl)pyrrolidone-5' | _____ |
| N-(4-amino-3-methylphenyl)pyrrolidone-5' | 83–6 |
| N-(4-nitrophenyl)-2'-methylpyrrolidone-5' | 105–10 |
| N-(4-aminophenyl)-2'-methylpyrrolidone-5' | 115–19 |
| N-(4-nitrophenyl)pyrrolidone-5' | 121–3 |
| N-(4-aminophenyl)pyrrolidone-5' | 119–22 |
| N-(4-nitro-2-methylphenyl)-2'-methylpyrrolidone 5' | 106–10 |
| N-(4-amino-2-methylphenyl)-2'-methylpyrrolidone-5' | 140–5 |
| N-(4-nitro-2-methylphenyl)pyrrolidone-5' | _____ |
| N-(4-amino-2-methylphenyl)pyrrolidone-5' | 115–20 |
| N-(4-aminophenyl)succinimide | _____ |
| N-(4-amino-3-methylphenyl)succinimide | _____ |
| N-(4-amino-2-methylphenyl)succinimide | _____ |

N-(4-aminophenyl)succinimide was prepared as described in Ann. 327 49 (1903). The other amino phenyl succinimides can be prepared similarly. The phenyl-pyrrolidones were prepared by condensing the appropriately substituted aniline and butyrolactone or valerolactone as described in Ber. 54, 211 (1921). The amino-compounds were prepared by nitration and reduction of the phenylpyrrolidones using well-known methods.

The following examples will serve to illustrate the preparation of representative intermediates and methine compounds of this invention.

*Example 1*

To a solution of 0.95 g. of N-(4-aminophenyl)-2'-methylpyrrolidone-5' in 15 ml. of 20% sulfuric acid was added a solution of 1 g. of 1,3,3-trimethylindoline-2-methylene-ω-aldehyde in 5 ml. of 20% sulfuric acid. The reaction mixture was stirred for four hours and then the orange solid filtered off and washed with a few ml. of water. The methine dye thus produced dyes acrylic fibers bright yellow shades with excellent fastness properties. The compound has the formula

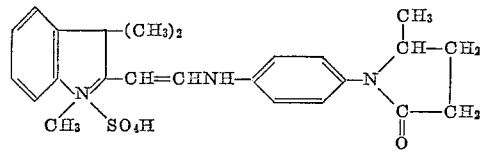

The following methine compounds are prepared in a similar manner by condensing the appropriate aldehydes and succinimides or pyrrolidones to obtain compounds of Formula II above. All of the compounds dye acrylic fibers in yellow shades. Thus, in Example 3, 1,3,3-trimethylindoline-2-methylene-ω-aldehyde is condensed with N-(p-aminophenyl)succinimide to obtain the compound indicated in the table.

METHINE COMPOUNDS (FORMULA II)

| Example | X | R₁ | R₂ | A₁ |
|---|---|---|---|---|
| 2 | H | H | H | CH₂ |
| 3 | H | H | H | C=O |
| 4 | H | H | CH₃ | CH₂ |
| 5 | H | H | CH₃ | CH—CH₃ |
| 6 | H | CH₃ | H | CH₂ |
| 7 | Cl | H | CH₃ | CH₂ |
| 8 | CO₂CH₃ | H | H | C=O |
| 9 | {CO₂C₂H₅, Cl} | CH₃, H | H, H | CH₂, C=O |

The following specific procedures can be used for making the compounds of Examples 3 and 6.

Example 3

A solution of 1.0 g. of 1,3,3-trimethylindoline-2-methylene-ω-aldehyde in 5 ml. of 20% H₂SO₄ was added to 0.95 g. of N(p-aminophenyl)succinimide in 15 ml. of 20% H₂SO₄. The reaction mixture was stirred at room temperature for 16 hrs., filtered, and the orange solid washed with a few ml. of water. After drying at room temperature, 2.0 g. of the dye are obtained. It dyes Orlon acrylic fabric bright yellow shades which show excellent fastness properties.

Example 6

1 g. of 1,3,3-trimethylindoline-2-methylene-ω-aldehyde and 1.02 g. of N(4-amino-3-methylphenyl)-pyrrolidone-5' were dissolved in 40 ml. of 20% H₂SO₄. The reaction mixture was stirred for 48 hrs. at room temperature, diluted to 600 ml. by addition of water. The solution was warmed to 60° C., .1 g. charcoal added, then filtered. After allowing to cool to room temperature the dye was precipitated by addition of NaI. It has the following formula:

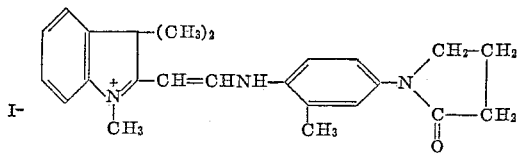

SYNTHESIS OF INTERMEDIATES

Example 10

*N(4-nitrophenyl)pyrrolidone-5.*—138 g. of p-nitroaniline, 91 g. of butyrolactone, and 1 ml. of conc. H₂SO₄ were heated and stirred at 175–180° C. for 2.5 hrs. After addition of 3 g. of sulfanilic acid the reaction mixture was heated and stirred for an additional 3 hours. It was then transferred, while still hot, to an evaporating dish and allowed to cool. The crude solid was ground well, slurried in dilute hydrochloric acid, filtered and washed with water and finally with a little methanol. Yield was 175 g. of material melting at 121–124° C.

*N(4-aminophenyl)pyrrolidone-5.*—50 g. of N(4-nitrophenyl)pyrrolidone-5 in 450 ml. of 2-B-alcohol was reduced over 5 g. of Raney nickel catalyst at 100° C. under 1500 p.s.i. of hydrogen. The reduction required 5 hrs. The hot alcoholic solution of the amino compound was filtered to remove the catalyst and the filtrate was evaporated to dryness, yielding 27 g. of N(4-aminophenyl) pyrrolidone melting at 122–123° C.

Example 11

The above synthesis beginning with p-nitroaniline and the lactone is a shorter route to the desired products than nitration of the N-phenylpyrrolidone-5; however, a typical nitration procedure is given below.

*N(4 - nitrophenyl)-2'-methylpyrrolidone-5'.*—100 g. of N-phenyl-2-methylpyrrolidone-5 was dissolved in 190 ml. of conc. H₂SO₄ with cooling to keep the temperature of addition below 30° C. 94 ml. conc. HNO₃ was added dropwise keeping the temperature of the nitration solution at 10 to 20° C. After the addition was complete the solution was poured into 1500 ml. of ice and water. The solid product was filtered off and washed well with water. The yield was 120 g. of material melting at 105–110° C.

*N(4-aminophenyl) - 2' - methylpyrrolidone-5'.*—This compound was reduced catalytically as described above.

The other methine compounds contemplated by Formulas I or II above are prepared similarly by condensing the corresponding aldehydes and amines.

The following procedure illustrates methods by which the methine compounds of the invention can be used to dye textile materials.

.1 gram of dye is dissolved by warming in 5 cc. of ethylene glycol monomethyl ether. A 2% aqueous solution of a nonionic surfactant, such as Igepal CA (a polymerized ethylene oxide-alkylphenol condensation product), is added and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 acrylic fiber the dyeing is carried out at the boil for one hour. In the case of materials made of Verel modacrylic fiber the dyebath temperature should not exceed 90° C. in order to avoid damage to the fiber. The dyed material is then washed well with water and dried.

Accordingly, the methine compounds of the invention can be applied from aqueous dispersions in the manner of the so-called "dispersed dyes." The methine compounds of our invention have varying utility as dyes. The degree of utility varies, for example, depending upon the material being dyed and the formula of the methine compound, the substituents on the indoline and aniline portions of the molecules functioning primarily as auxochrome groups to determine the color of the compound. Thus, for example, all the dyes may not have the same degree of utility for the same material.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A methine compound having the formula

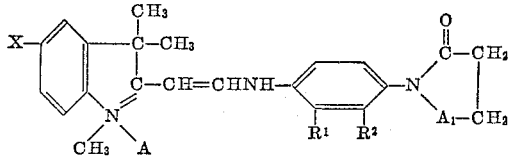

wherein
X represents hydrogen, halogen, or lower carbalkoxy;
A represents a monovalent organic or inorganic acid anion;
R¹ and R² each represents hydrogen or lower alkyl; and
A₁ represents

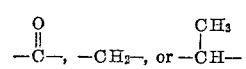

2. A methine compound as defined in claim 1 wherein X represents hydrogen and A₁ represents

3. A methine compound as defined in claim 2 wherein A represents Cl⁻, Br⁻, I⁻, SO₄H⁻, or

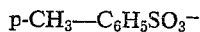

4. A methine compound as defined in claim 1 wherein X represents hydrogen and A₁ represents —CH₂—.

5. A methine compound as defined in claim 4 wherein A represents Cl⁻, Br⁻, I⁻, SO₄H⁻, or p-CH₅C₆H₅SO₃⁻.

6. A methine compound as defined in claim 1 wherein X represents hydrogen and $A_1$ represents

7. A methine compound as defined in claim 6 wherein A represents Cl⁻, Br⁻, I⁻, SO₄H⁻, or

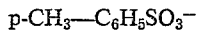

8. The compound

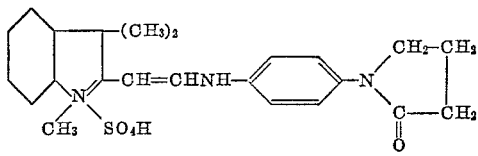

9. The compound

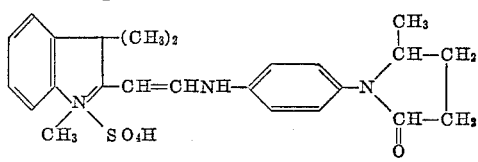

10. The compound

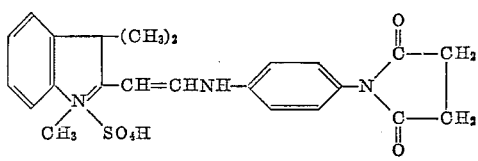

11. The compound

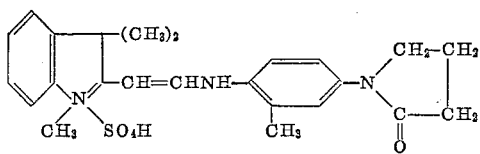

12. The compound

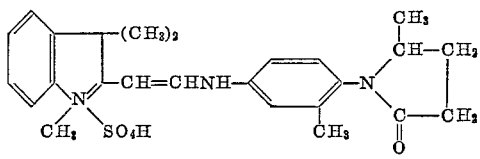

References Cited by the Examiner
UNITED STATES PATENTS

| | | | |
|---|---|---|---|
| 3,194,812 | 7/1965 | Norman et al. | 260—326.5 |
| 3,235,497 | 2/1966 | Lee | 260—326.5 |

OTHER REFERENCES

Chemical Abstracts, vol. 56, cols. 5540 and 2150s (1962).

Reppe: Annalen der Chemie, vol. 596, pages 176 and 204–209 (1955).

JOHN D. RANDOLPH, *Primary Examiner.*